United States Patent
Uchida et al.

(10) Patent No.: US 6,779,121 B1
(45) Date of Patent: Aug. 17, 2004

(54) STORAGE APPARATUS ACCESS CONTROL APPARATUS FOR A RECORDING MEDIUM, AND ACCESS CONTROL METHOD FOR A RECORDING MEDIUM

(75) Inventors: Yoshiaki Uchida, Kanagawa (JP); Hiroyuki Kobayashi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/496,740

(22) Filed: Feb. 3, 2000

(30) Foreign Application Priority Data

Jul. 9, 1999 (JP) .......................................... 11-196770

(51) Int. Cl.[7] .................................................. G06F 1/24
(52) U.S. Cl. ..................... 713/202; 713/182; 713/183; 713/184; 713/200; 713/201
(58) Field of Search ................................ 713/202, 182, 713/183, 184, 200, 201

(56) References Cited

U.S. PATENT DOCUMENTS

| | | | |
|---|---|---|---|
| 5,198,806 A | * 3/1993 | Lord ........................... | 713/200 |
| 5,497,421 A | * 3/1996 | Kaufman et al. ........... | 713/156 |
| 5,644,444 A | 7/1997 | Braithwaite et al. .......... | 360/60 |
| 5,821,871 A | * 10/1998 | Benzler ...................... | 340/5.8 |

FOREIGN PATENT DOCUMENTS

| | | |
|---|---|---|
| JP | 57150117 | 9/1982 |
| JP | 60189531 | 9/1985 |
| JP | 63175955 | 7/1988 |
| JP | 1309120 | 12/1989 |
| JP | 7182112 | 7/1995 |
| JP | 7182244 | 7/1995 |
| JP | 8255232 | 10/1996 |
| JP | 11053264 | 2/1999 |
| JP | 11213551 | 8/1999 |
| WO | 9628820 | 9/1996 |

OTHER PUBLICATIONS

Tadahiro Uezono et al.; *Cipher and Data Security*; Baihukan, 1988; pp. 164–167.

* cited by examiner

Primary Examiner—Thomas R. Peeso
(74) Attorney, Agent, or Firm—Greer, Burns & Crain, Ltd.

(57) ABSTRACT

A storage apparatus includes a recording medium 40 on which a coded password $XW_1$, generated by coding a password assigned to a user using a coding algorithm (one-way function) is recorded. A coding section produces a coded password $XW_2$ by coding a password $PW_2$ input by the user using the coding algorithm, and a checking section compares the coded passwords $XW_1$ and $XW_2$. An access control section permits access to the recording medium when the checking section judges that the passwords $XW_1$ and $XW_2$ match, while barring access when the passwords $XW_1$ and $XW_2$ do not match.

8 Claims, 6 Drawing Sheets

STORAGE APPARATUS ACCESS CONTROL APPARATUS FOR A RECORDING MEDIUM, AND ACCESS CONTROL METHOD FOR A RECORDING MEDIUM

FIELD OF THE INVENTION

The present invention relates to a storage apparatus, an access control apparatus for a recording medium and an access control method for a recording medium, having a function of preventing a third party from unjustly accessing to the recording medium using a password. More particularly, this invention relates to a technology for improving the security by recording a coded password produced by coding a user password with a one-way function on the recording medium.

BACKGROUND OF THE INVENTION

In recent years, storage apparatuses including various types of recording media are being developed. In particular, with the spread of personal computers, the storage apparatuses generally use removable media, such as magneto-optical disks, floppy disks, and optical disks as the recording media. Although the recording media of this type have the advantage of easy handling because of their small size and light weight, they have also the disadvantages that they can easily be taken away by a third party and the data can easily be stolen or altered. Therefore, passwords or the like have been conventionally used to prevent stealing and alteration of the data.

In a conventional storage apparatus, in order to improve the security by preventing unauthorized access (reading/writing and deletion) by a third party, a password is set in advance in a recording medium and an internal memory of the device. When a user inputs a password (the user may be an authorized person or a third party), it is compared with the already recorded password, and access to the recording medium is permitted only when the two passwords match.

The storage apparatus explained above is described in detail in Japanese Patent Application Laid-Open Nos. SHO 57-150117, SHO 60-189531, SHO 63-175955, and HEI 01-309120. In a storage apparatus of this type, the password recorded in the recording medium and internal memory of the device is an unprocessed data, namely which has not been subjected to any processing, or data which is almost analogous to the unprocessed data.

Such an access control by password checking is useful when, for example, a removable recording medium on which images, music data, application programs, or the like are recorded is to be rent to the user. In other words, in this case, by recording a password on a recording medium, it is possible to permit only a specified user to access to the recording medium.

By the way, it is mentioned in the above that a password written in the recording medium and the internal memory of the device is unprocessed data or almost analogous to the unprocessed data. Even when the password is unprocessed data, it is possible to prevent unauthorized access by general users by performing the above-described password checking or by recording the password in a recording area which can not be read by any known command.

However, in a service center providing a maintenance service (for defects) for the storage apparatus and the recording medium, when a service person inputs a hidden maintenance command categorized as a "service command", the user password can be read out from the recording medium. Moreover, there is another method of physically obtaining the password with the use of a test and repair tool. Thus, a malicious service person can obtain the user password using the service command and access to the recording medium with the use of this user password. In short, it is actually possible to steal, alter and delete data on the recording medium in the service center, and hence it would be a serious security hole.

Such security problems may be solved by following the procedure shown in FIG. 6. Specifically, when a recording medium (including a storage apparatus) has some defect, the user $U_1$ (or the user $U_2$) brings the defective recording medium to the service center $SV_1$ (or the service center $SV_2$). In this case, in order to avoid the security hole, the authority in the service center $SV_1$ or $SV_2$ only listens to the problems with the recording medium, but does not actually provide a service to the defect.

The recording medium is then sealed for confidential reasons in the service center $SV_1$ or $SV_2$ and sent to an expert H. The expert H is a person who is exclusively appointed for providing a service to defects and it is supposed that he does not do anything with the data inside. The expert H analyzes the defect in the recording medium, and then informs the user $U_1$ (or the user $U_2$) of the result of analysis and returns the recording medium to the user $U_1$ (or the user $U_2$).

However, according to the procedure shown in FIG. 6, in order to achieve a quick reply/return to the user $U_1$ (user $U_2$), it is necessary to employ many experts H who are hired at high salary. Consequently, there is a problem that the costs of service and maintenance are increased.

Moreover, if many experts H are hired, it would raise a possibility that the information relating to the above-mentioned service command is leaked out to general users. In such a case, because a certain user might know a user password of a recording medium belonging to another person and unjustly access to the recording medium, an authorized user will be anxious. Therefore, the quality of the customer service will be lowered. Meanwhile, a magnetic strip card as another example of the recording medium also assures the security by password checking. In the case of the magnetic strip card, however, the password can be obtained by applying magnetic powder or the like to a recorded area, without using a special device.

SUMMARY OF THE INVENTION

In view of the above-mentioned problems, an object of the present invention is to provide a storage apparatus, an access control apparatus for a recording medium and an access control method for a recording medium, capable of improving the security of the recording medium, reducing the costs of service and maintenance, and improving the customer service.

According to one aspect of this invention, when the user inputs a password, a coding unit codes this password using a one-way function. A password coded in the same manner is already stored in the recording medium and a reading unit reads this password. A checking unit compares the password (coded) input by the user and the password read out from the recording medium. An access control unit permits the access to the recording medium if the two passwords match and prohibits the access when they do not. The password input by an unauthorized person will not match with the password recorded on the recording. Therefore, access to the recording medium by the unauthorized person can be prohibited.

The "one-way function" means a function having such characteristics that a value Y (in this case, the coded password) of the function is relatively easily obtained from an input Y (in this case, the user password), but it is difficult to obtain an input x from the value Y based on the current mathematical knowledge. For instance, it has been known that it is relatively easy to multiply large prime numbers together, but it is difficult to obtain the original two prime numbers by resolving the product into factors. Moreover, for prime numbers p and q, it has been known that it is easy to calculate the power of the prime number p with the prime number q as a devisor, but it is extremely difficult to perform the reverse calculation, for certain values of the prime numbers p and q.

Further, since the one-way function is used in order to code the passwords, the third party (including a service person for maintaining the recording medium, etc.) can not derive the user password from the coded password because of the characteristics of the one-way function. Thus, according to the invention of the above aspect, since in reality the third party can not obtain the user password by using whatever means, it is possible to prevent unauthorized access to the recording medium, thereby achieving a significant improvement in the security.

Moreover, since a highly secure recording medium can be provided for the users, the customer service can be improved. Furthermore, according to the invention of the above aspect, since a service person (general operator or part-time operator) hired at a lower salary than an expert may provide a service to the defect in the recording medium while assuring the security, it is possible to lower the costs of service and maintenance.

Further, when setting a user password, the coding unit produces the old coded password and the new coded password by coding the old user password and the new user password, respectively, with the one-way function. Then, the checking unit compares the old coded password and the coded password read out from the recording medium, and the setting unit writes the new coded password on the recording medium only when the checking unit judges that these coded passwords match.

Thus, when setting or changing a user password, whether or not a user performing the setting is an authorized person is checked by password checking, and a new coded password is written on the recording medium only when the passwords match. Thus, the security is assured even after the setting.

According to another aspect of this invention, when a user password is input, the coding unit produces a coded password from the user password input by the user with the use of the one-way function. Next, the checking unit compares the produced coded password and a coded password read out from the recording medium. Then, the access control unit permits access to the recording medium only when the passwords compared by the checking unit match. Thus, when a wrong password is input by an unauthorized third party, the checking unit judges that the passwords do not match, and access to the recording medium is prohibited.

Since the coded password produced from the user password with the use of the one-way function is written on the recording medium, the third party (including a service person) can not derive the user password from the coded password because of the characteristics of the one-way function. Thus, according to the invention of the third aspect, since in reality the third party can not obtain the user password by using whatever means, it is possible to prevent unauthorized access to the recording medium, thereby achieving a significant improvement in the security.

Moreover, while a highly secure recording medium can be provided to the users, the customer service can be improved. Furthermore, according to the invention of the third aspect, since a service person hired at a lower salary than an expert may provide a service to the defect in the recording medium while assuring the security, it is possible to lower the costs of service and maintenance.

According to another aspect of this invention, when the user inputs a password, this password is coded using a one-way function in a coding step. A password coded in the same manner is already stored in the recording medium and this password is read in a reading step. In a checking step the password (coded) input by the user and the password read out from the recording medium are compared. An access control unit permits the access to the recording medium if the two passwords match and prohibits the access when they do not. The password input by an unauthorized person will not match with the password recorded on the recording. Therefore, access to the recording medium by the unauthorized person can be prohibited.

Other objects and features of this invention will become apparent from the following description with reference to the accompanying drawings.

DESCRIPTION OF THE PREFERRED EMBODIMENTS

Referring to the attached drawings, the following description will explain in detail an embodiment of a storage apparatus, an access control apparatus for a recording medium and an access control method for a recording medium according to the present invention.

Figure 1:
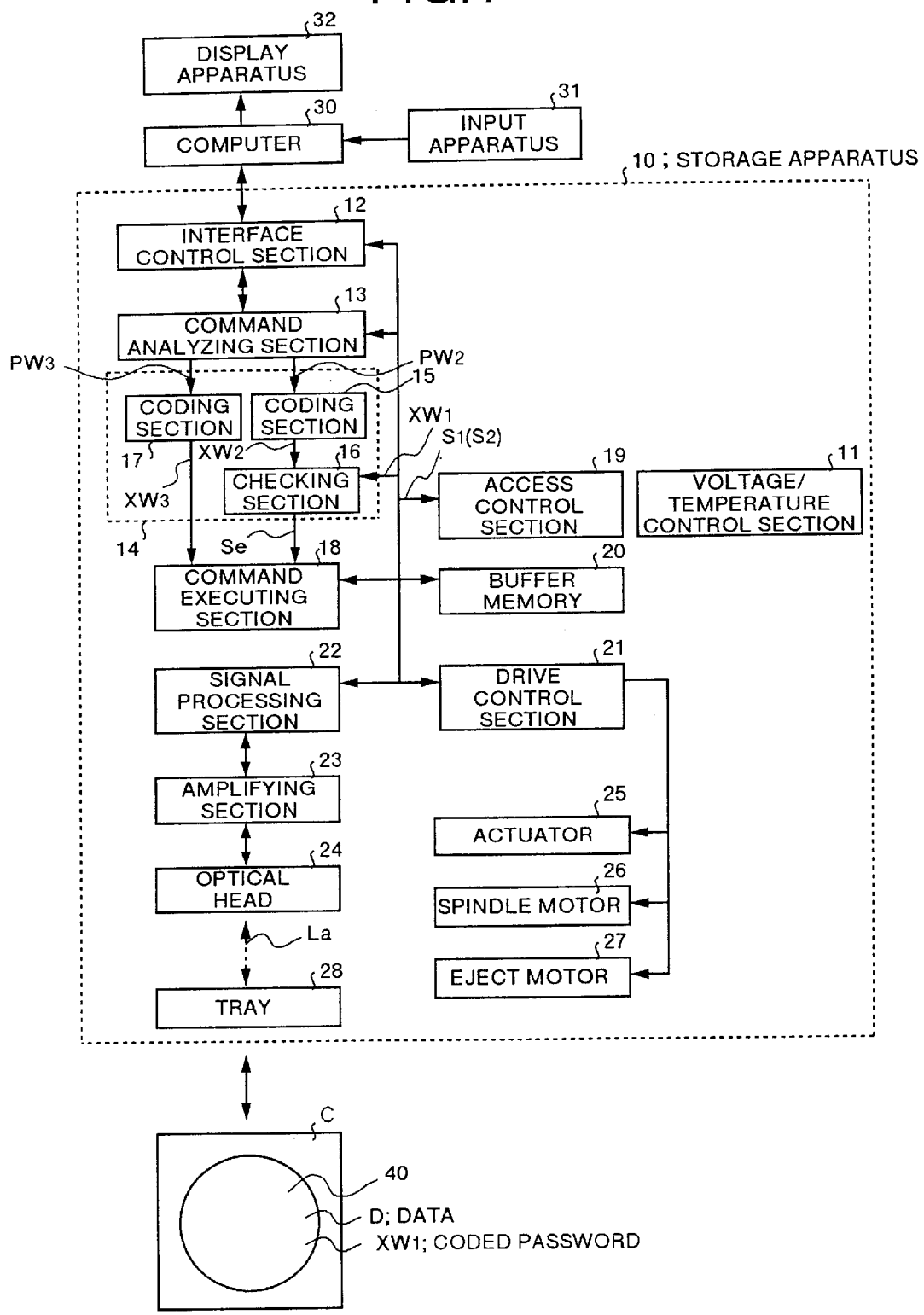
FIG. 1 is a block diagram showing the structure of an embodiment according to the present invention.

FIG. 1 is a block diagram showing the structure according to the present invention. In FIG. 1, a storage apparatus 10 is a device for writing/reading data on a removable recording medium 40, according to a command from a computer 30. The computer 30 is connected to the storage apparatus 10 through a not shown SCSI (small computer system interface) cable.

The computer 30 sends commands for instructing writing/reading data on the recording medium 40, data, a user password $PW_2$, etc to the storage apparatus 10. This user password $PW_2$ is used for checking whether a person trying to write/read data on the recording medium 40 is an authorized person. In other words, the user password $PW_2$ is used by a user for assuring security and preventing unauthorized writing/reading from being performed by a third party. User password $PW_3$ shown in FIG. 1 is a new password used when changing the user password $PW_2$. The user password $PW_3$ will be explained in detail later.

The recording medium 40 is, for example, a disk-shaped MO (magneto-optical) disk which allows optical writing/reading of data, and is contained in a resin case C. Data D is recorded on the recording medium 40 in a data recording area and a coded password $XW_1$ is recorded in a coded password recording area. The data D may be image data, contents information such as music, various application programs, etc. Thus, the recording medium 40 is given to the user by a provider with or without cost. Besides, a coded password $XW_1$ is a password produced by coding a user password by a coding (cipher) algorithm.

An input device 31 is a keyboard, a mouse, etc., and used for the entry of the above-mentioned password as well as various inputs. A display device 32 is a CRT (cathode-ray tube), LCD (liquid crystal display), etc., and displays data to be written on the recording medium 40 and data read out from the recording medium 40.

In this storage apparatus 10, a voltage/temperature control section 11 controls a power supply voltage and the temperature in the device. An interface control section 12 controls communications between the storage apparatus 10 and the computer 30. The interface control section 12 receives commands, data, passwords, etc. from the computer 30, and temporarily stores them in a buffer memory 20. The buffer memory 20 is a DRAM (dynamic random access memory), and temporarily stores the data to be written on the recording medium 40 and the data D read out from the recording medium 40 as well as commands and the user password $PW_2$.

Besides, the interface control section 12 sends the readout data D to the computer 30. A command analyzing section 13 analyzes a command stored in the buffer memory 20, and identifies the type of the command. Examples of such a command are a command for reading out the data D from the recording medium 40, a command for writing data on the recording medium 40, and a command for setting a user password.

A coding/checking section 14 performs a function of coding the user password $PW_2$ (or the user password $PW_3$) input by a user using the coding algorithm, and a function of checking the password, before reading out the data D from the recording medium 40. The coding/checking section 14 includes a coding section 15, a checking section 16, and a coding section 17. The coding section 15 produces a coded password $XW_2$ from the user password $PW_2$ with the help of the coding algorithm.

The checking section 16 compares the coded password $XW_2$ and the coded password $XW_1$ read out from the recording medium 40 before granting access to the recording medium 40, and outputs an access permission signal $S_1$ to an access control section 19 when the two passwords match. The access permission signal $S_1$ is a signal for permitting an access (reading/writing) to the recording medium 40. On the other hand, if the coded password $XW_2$ and the coded password $XW_1$ do not match, the checking section 16 outputs an access prohibition signal $S_2$ to the access control section 19. The access prohibition signal $S_2$ is a signal for prohibiting an access (reading/writing) to the recording medium 40.

Like the coding section 15, the coding section 17 produces a coded password $XW_3$ from a new user password $PW_3$ with the help of a coding algorithm. This user password $PW_3$ is a new user password used when changing the already set user password $PW_2$. Further, the checking section 16 compares the coded password $XW_2$ and the coded password $XW_1$ before changing the user password $PW_2$ to the user password $PW_3$, and outputs a write enable signal, $S_e$ to a command executing section 18 only when these passwords match. This write enable signal $S_e$ is a signal for instructing writing of the new coded password $XW_3$ in the coded password recording area of the recording medium 40.

Figure 2A:
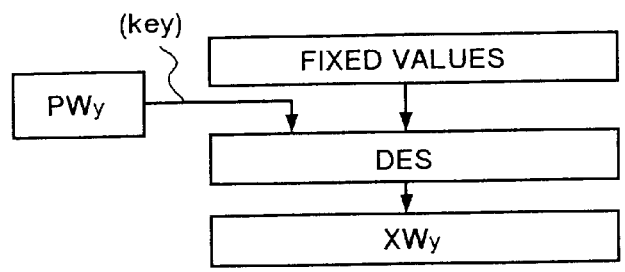
FIG. 2A to FIG. 2C are diagrams showing examples of coding algorithms according to this embodiment.
Figure 2B:
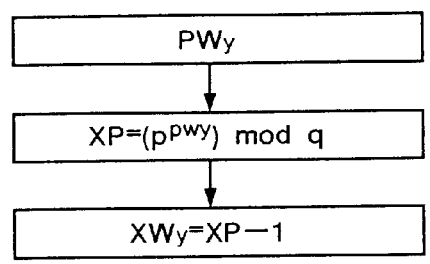
Figure 2C:
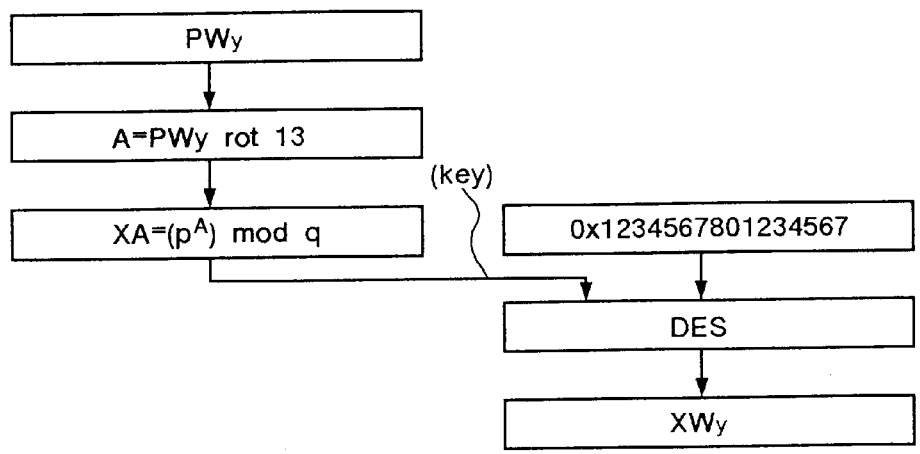

Referring now to FIGS. 2A to 2C, the following description will explain examples of the coding algorithms used in the above-mentioned coding section 15 and coding section 17. The term coding algorithm referred here means an algorithm for producing a coded password $XW_y$ (y=1, 2, 3, . . . ) from a user password $PW_y$ (y=1, 2, 3, . . . ) with the use of a one-way function. The one-way function has such characteristics that it is easy to obtain a function F(x) from a variable x, but it is difficult to obtain the variable x from the value of the function F(x).

It is thus difficult to obtain the user password $PW_y$ from the coded password $XW_y$ produced by the coding algorithm. Thus, it is actually impossible for a third party who tries to perform unauthorized access to obtain the user password $PW_y$ from the coded password $XW_y$. Hence, the coded password $XW_y$ is an extremely effective password for assuring security.

In a coding algorithm shown in FIG. 2A, fixed values (for example, all zero) which are kept secret from general people are input, and the coded password $XW_y$ is produced by using the user password $PW_y$ as a key with the fixed values by a DES (data encryption standard) cipher system. The DES cipher system is a standard cipher system established by the National Institute of Standards and Technology in 1977.

Besides, in a coding algorithm shown in FIG. 2B, a calculation of an exponential remainder is used. Specifically, in this coding algorithm, an exponential remainder XP ($=(p^{PW_y})$ mod q), where p and q are prime numbers and $PW_y$ is the user password, is calculated, and then a result obtained by subtracting one from the exponential reminder XP is used as the coded password $XW_y$. The prime numbers p and q are extremely large values between $2^{100}$ and $2^{300}$.

Further, in a coding algorithm shown in FIG. 2C, first, a value A is calculated by assigning the user password $PW_y$ in an equation, A=$PW_y$ rot 13. Exponential remainder XA is then calculated by assigning the prime numbers p and q and the value A in an equation, XA=($p^A$) mod q (where p and q are prime numbers).

Subsequently, like in the above-mentioned coding algorithm shown in FIG. 2A, the exponential remainder XA is used as a key with the values 0x1234567801234567 which are kept secret from general people to produce the coded password $XW_y$ by the DES (data encryption standard) cipher system. The coding section 15 and coding section 17 shown in FIG. 1 perform coding with the use of any one of the above-described three coding algorithms.

The command executing section 18 executes writing/reading, password setting, etc. according to the result of analysis of the command analyzing section 13, the write enable signal $S_e$, etc. The operation of the command executing section 18 will be explained in detail later. The access control section 19 controls access to the recording medium 40 according to the access permission signal $S_1$ or the access prohibition signal $S_2$ input from the checking section 16. The access control will be described in detail later.

A drive control section 21 supplies a drive voltage to later-described actuator 25, spindle motor 26 and eject motor 27, and performs servo control. A signal processing section 22 modulates data to be written on the recording medium 40, and demodulates a readout signal from an optical head 24. An amplifying section 23 amplifies the signal read by the optical head 24.

This optical head 24 is a read/write head that is provided adjacent to a recording surface of the recording medium 40, and has a function of writing data on the recording medium 40 and a function of reading out data from the recording medium 40 by irradiating laser light La on the recording surface of the recording medium 40. The optical head 24 includes a semiconductor laser for generating the laser light La, an objective lens for narrowing down the beam diameter of the laser light La to be irradiated on the recording surface of the recording medium 40, optical components (collimate lens and beam splitter) for guiding the laser light LA generated by the semiconductor laser to the objective lens, and a light receiving element for receiving reflected light from the recording medium 40 and converting the reflected light to an electrical signal.

The actuator 25 includes a drive coil and moves the objective lens of the optical head 24 in a radial direction of the recording medium 40 and a focusing direction. Here, the focusing direction denotes a direction perpendicular to the recording surface of the recording medium 40. A movable tray 28 is provided for storing the recording medium 40 during writing/reading. The eject motor 27 drives the tray 28 when ejecting the recording medium 40. The spindle motor 26 drives and rotates the recording medium 40 stored in the tray 28 during writing/reading.

Figure 3:
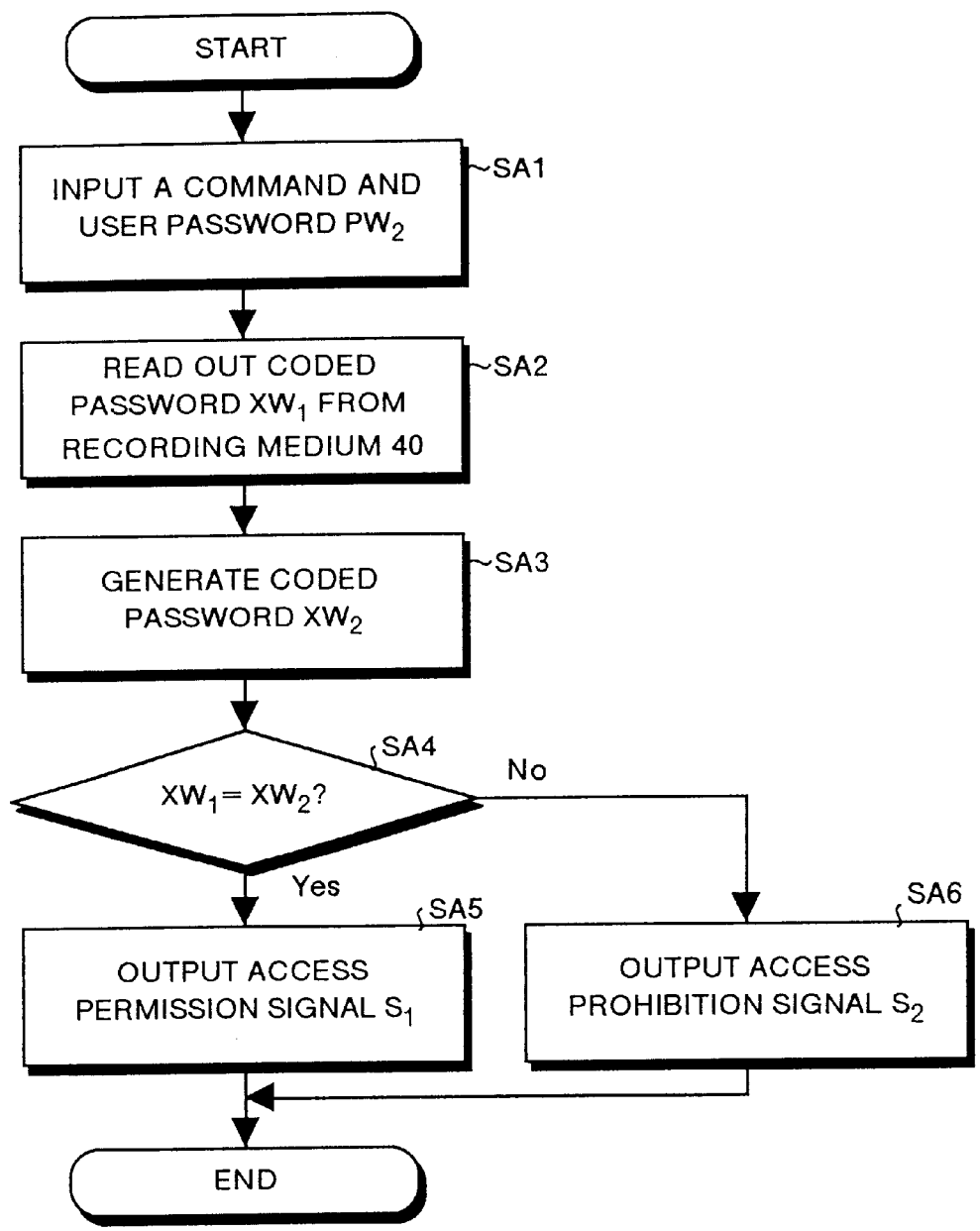
FIG. 3 is a flowchart explaining a password checking process according to this embodiment.
Figure 4:
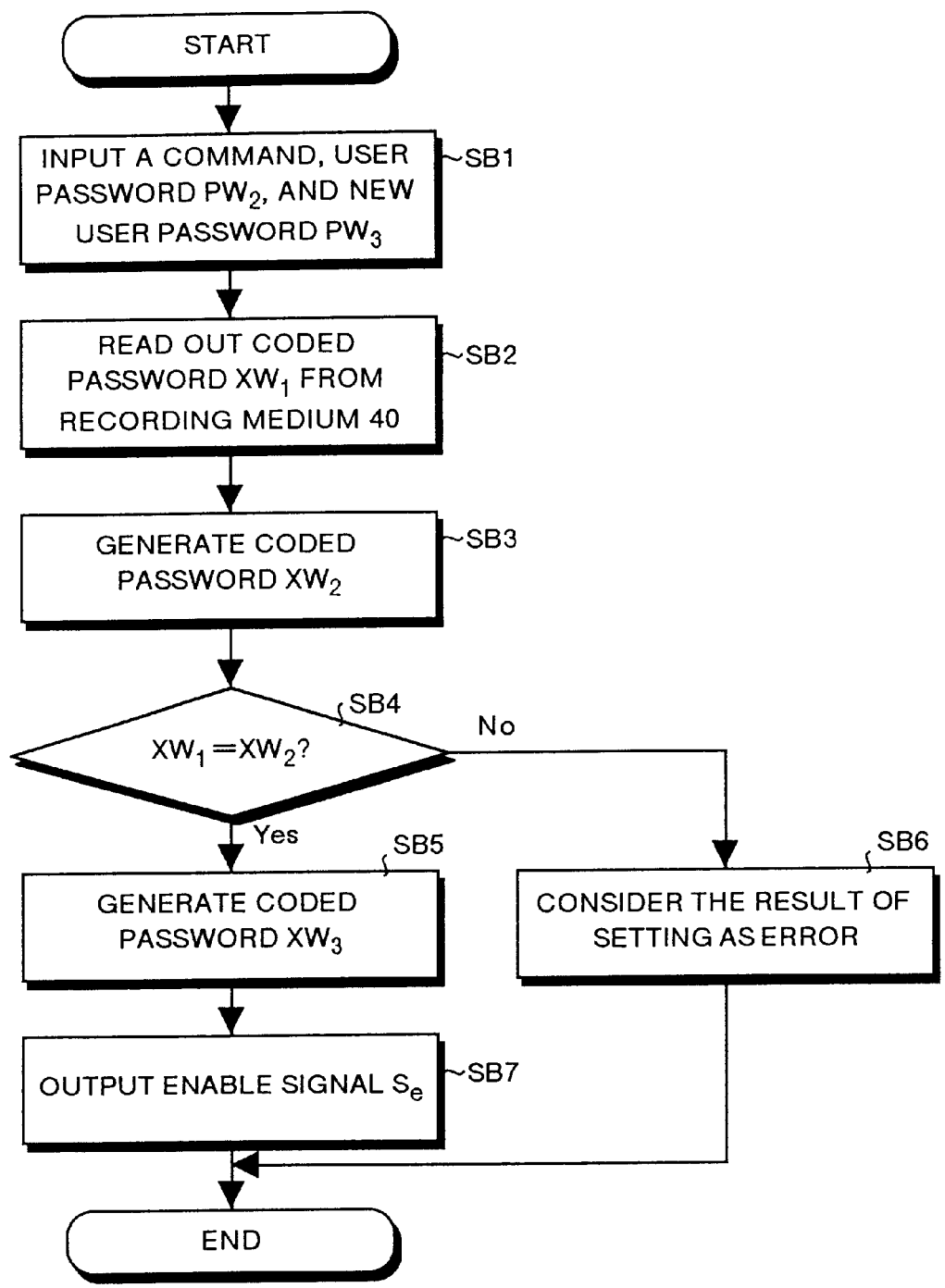
FIG. 4 is a flowchart explaining a password setting (or changing) process according to this embodiment.

Referring now to the flowcharts shown in FIG. 3 and FIG. 4, the following description will explain the operation of this embodiment. To begin with, password checking according to this embodiment will be explained with reference to FIG. 3. It is assumed that the data D and the coded password $XW_1$ are recorded on the recording medium 40 shown in FIG. 1.

In step SA1 shown in FIG. 3, after setting the recording medium 40 in the tray 28, a user inputs a command (for example, a read command) and the user password $PW_2$ through the input device 31. As a result, the command and the user password $PW_2$ are sent to the storage apparatus 10 through the SCSI cable by the computer 30. When the command and the user password $PW_2$ are received by the interface control section 12, they are stored in the buffer memory 20.

The command analyzing section 13 then analyzes the command and passes the result of analysis to the command executing section 18 and also passes the user password $PW_2$ to the coding section 15. Accordingly, in step SA2, the command executing section 18 controls the optical head 24 to read out the coded password $XW_1$ from the recording medium 40 and then passes the coded password $XW_1$ to the checking section 16. In the next step, SA3, the coding section 15 produces the coded password $XW_2$ from the user password $PW_2$ using the coding algorithm (see FIG. 2A to FIG. 2C) and then passes the coded password $XW_2$ to the checking section 16.

Accordingly, in step SA4, the checking section 16 compares the coded password $XW_1$ and the coded password $XW_2$. In other words, the checking section 16 judges whether the coded password $XW_1$ matches the coded password $XW_2$. Assuming that the user password $PW_2$ is properly input by an authorized user having a right to access to the recording medium 40, the coded password $XW_1$ will match the coded password $XW_2$. In this case, therefore, the checking section 16 considers the result of judgement as "Yes" and proceeds to step SA5.

In step SA5, after outputting the access permitting signal $S_1$ to the access control section 19, the checking section 16 completes a sequence of processing. When the access permission signal $S_1$ is input, the access control section 19 gives the command executing section 18 a permission to access the recording medium 40. The command executing section 18 controls the optical head 24 to access the recording medium 40 according to the command (for example, a read command), and read out the data D from the recording medium 40.

The data D is output to the computer 30 through the SCSI cable by the interface control section 12. Then, the computer 30 reproduces the data D. Thus, when the user inputs a correct password $PW_2$, since the result of judgement in step SA4 is Yes, access to the recording medium 40 is permitted.

Following description will explain an operation performed when an unauthorized third party pretends to be an authorized user and tries to read out the data D unjustly from the recording medium 40. In this case, in step SA1 shown in FIG. 3, after setting the recording medium 40 in the tray 28, the third party inputs a command (for example, a read command) and the user password $PW_2$ through the input device 31.

However, since the third party does not know a password, the password $PW_2$ input here is a wrong password. The command and the (wrong) user password $PW_2$ are sent to the storage apparatus 10 through the SCSI cable by the computer 30. After the command and the (wrong) user password $PW_2$ are received by the interface control section 12, they are stored in the buffer memory 20.

The command analyzing section 13 then analyzes the command and passes the result of analysis to the command executing section 18 and also passes the (wrong) user password $PW_2$ to the coding section 15. Accordingly, in step SA2, the command executing section 18 reads out the coded password $XW_1$ from the recording medium 40, and then passes the coded password $XW_1$ to the checking section 16. In the next step, SA3, the coding section 15 produces the coded password $XW_2$ from the (wrong) user password $PW_2$ using the coding algorithm and then passes the coded password $XW_2$ to the checking section 16. The coded password $XW_2$ produced here is also a wrong coded password.

Accordingly, in step SA4, the checking section 16 compares the coded password $XW_1$ and the (wrong) coded password $XW_2$. In this case, since the coded password $XW_1$ and the (wrong) coded password $XW_2$ do not match, the checking section 16 considers the result of judgement as "No" and proceeds to step SA6. In step SA6, after outputting the access prohibition signal $S_2$ to the access control section 19, the checking section 16 completes a sequence of processing. When the access prohibition signal $S_2$ is input, the access control section 19 prohibits the command executing section 18 from accessing to the recording medium 40. Accordingly, the command executing section 18 does not execute the command (in this case, a read command), therefore, the third party can not obtain the data D from the recording medium 40.

The third party may try to obtain the correct user password $PW_2$ with the use of the above-mentioned maintenance-use test and repair tool. However, the password read out from the recording medium 40 with the use of the test and repair tool will be the coded password $XW_1$. As described above, the coded password $XW_1$ is a password produced by coding the user password $PW_2$ with a one-way function (coding algorithm).

Therefore, the third party can not obtain the user password $PW_2$ because it is impossible to obtain the user password $PW_2$ from the readout coded password $XW_1$ due to the characteristics of the one-way function. In other words, the third party can not read out the data D unjustly from the recording medium 40 by using whatever means.

Referring now to FIG. 4, the following description will explain setting (changing) of a password according to this embodiment. With the following procedure, the user password $PW_2$ which has already been set as mentioned in the explanation of FIG. 1 can be changed to a new password $PW_3$. In step SB1 shown in FIG. 4, the user sets the recording medium 40 in the tray 28 and then inputs a command (for example, a set command), the already set user password $PW_2$ and the new password $PW_3$ using the input device 31.

The computer 30 sends the command, the user password $PW_2$ and the user password $PW_3$ to the storage apparatus 10 through the SCSI cable. When the command, the user password $PW_2$ and the user password $PW_3$ are received by the interface control section 12, they are stored in the buffer memory 20.

The command analyzing section 13 then analyzes the command and passes the result of analysis to the command executing section 18 and also passes the user passwords $PW_2$ and $PW_3$ to the coding section 15 and coding section 17, respectively. Accordingly, in step SB2, the command executing section 18 controls the optical head 24 to read out the coded password $XW_1$ from the recording medium 40 and then passes the coded password $XW_1$ to the checking section 16. In the next step, SB3, the coding section 15 produces the coded password $XW_2$ from the user password $PW_2$ using the coding algorithm and then passes the coded password $XW_2$ to the checking section 16.

Accordingly, in step SB4, the checking section 16 compares the coded password $XW_1$ and the coded password $XW_2$. In other words, the checking section 16 judges whether the coded password $XW_1$ matches the coded password $XW_2$. Assuming that the user password $PW_2$ is properly input by an authorized user having a right to access to the recording medium 40, the coded password $XW_1$ will match the coded password $XW_2$. In this case, therefore, the checking section 16 decides the result of judgement as "Yes" and proceeds to step SB5.

In the next step SB5, the coding section 17 generates a coded password $XW_3$ from the new user password $PW_3$ using the coding algorithm and then passes the coded password $XW_3$ to the command executing section 18. In the next step SB7, since the result of judgement in step SB4 is Yes, the checking section 16 outputs the write enable signal $S_e$ to the command executing section 18. Accordingly, the command executing section 18 controls the optical head 24 to access to the recording medium 40 and write the new coded password $XW_3$ in the coded password recording area of the recording medium 40.

Therefore, in the coded password recording area of the recording medium 40, the new coded password $XW_3$ is overwritten on the coded password $XW_1$. Thereafter, the user can obtain the data D from the recording medium 40 by inputting the new user password $PW_3$ in the above-mentioned password checking process (see FIG. 3). Incidentally, in step SB4, if the result of judgement is "No", the checking section 16 considers the result of setting as error, and does not output signal. In this case, therefore, the password is not changed.

As explained above, according to this embodiment, since a coded password produced from a user password with the use of a one-way function (coding algorithm) is written on the recording medium, the third party (including a service person) can not derive the user password from the coded password due to the characteristics of the one-way function.

Hence, according to this embodiment, since in reality the third party can not obtain the user password by using whatever means, it is possible to prevent unauthorized access to the recording medium 40, thereby achieving a significant improvement in the security. Moreover, according to this embodiment, since a highly secure recording medium 40 can be given to the user, the customer service can be improved.

Figure 5:
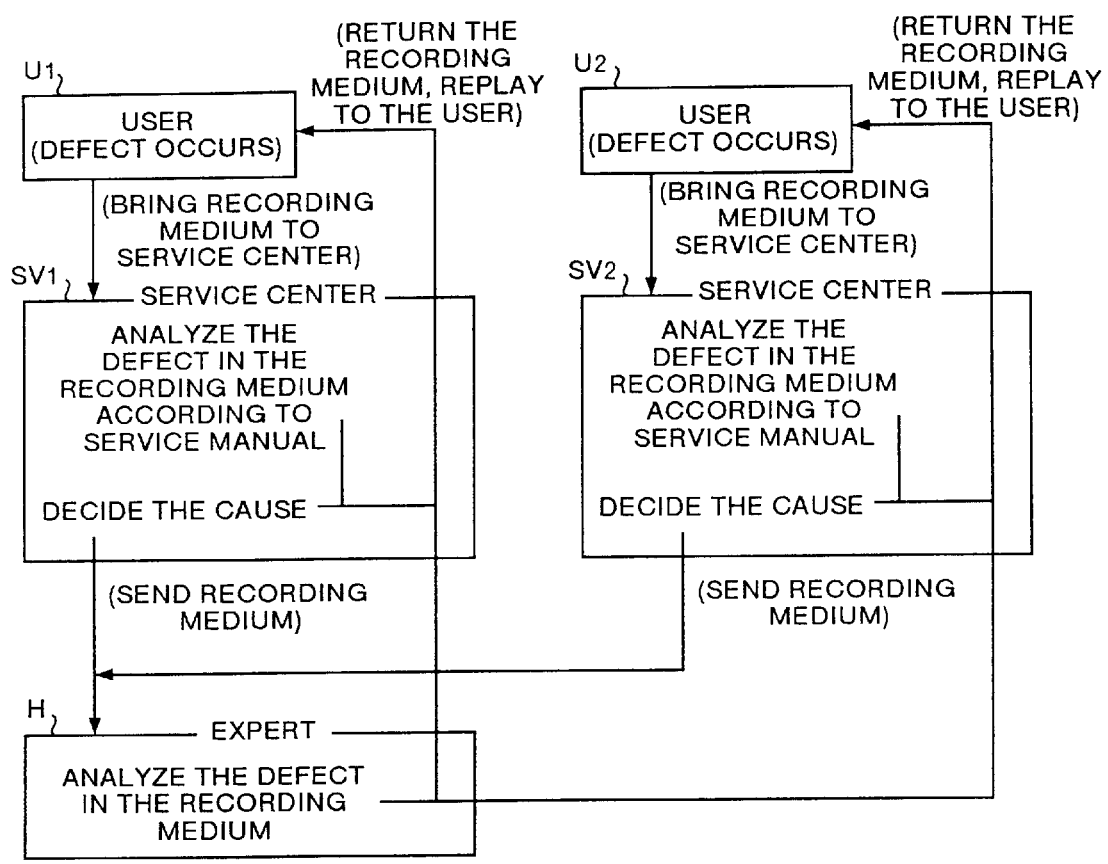
FIG. 5 is a diagram explaining a procedure to be followed when a recording medium has some defect according to this embodiment.
Figure 6:
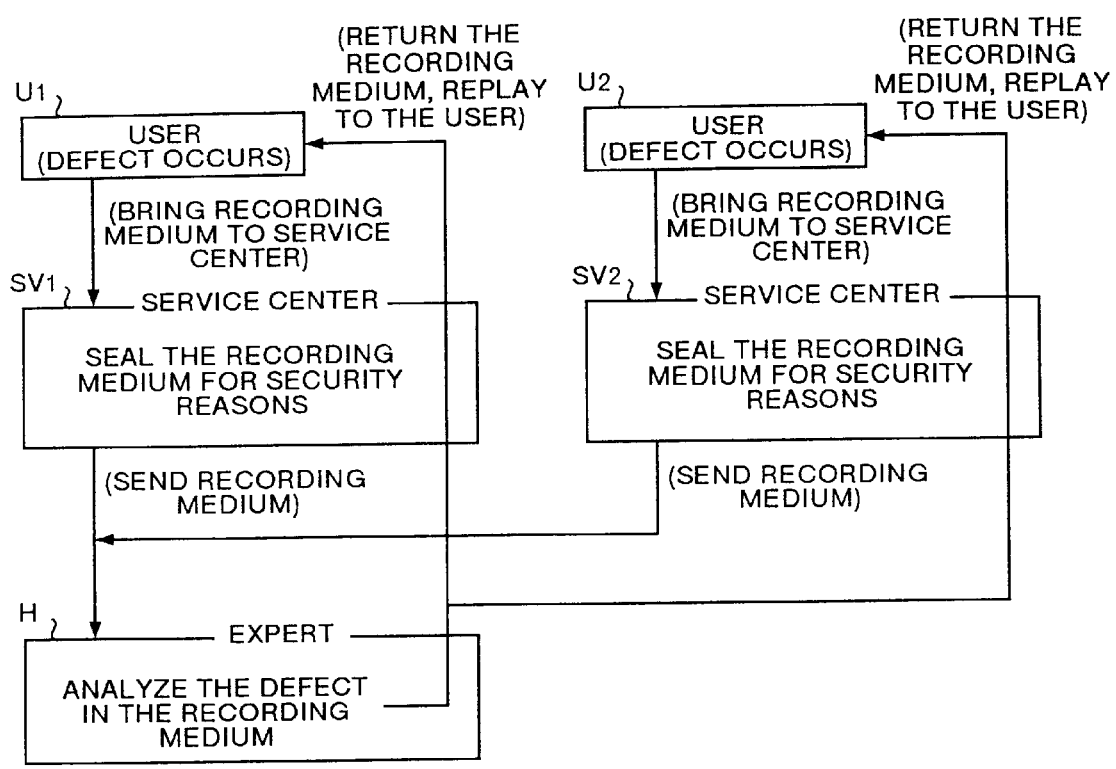
FIG. 6 is a diagram explaining problems of a conventional example.

Referring now to FIG. 5, the following description will explain the procedure to be followed when the recording medium 40 has some defect. In FIG. 5, when the recording medium (including the storage apparatus) has some defect, a user $U_1$ (or a user $U_2$) brings the defective recording medium to a service center $SV_1$ (service center $SV_2$). In this case, since the security of the recording medium is assured as described above, the people in the service center $SV_1$ (on the service center $SV_2$) will not only listens to the defect in the recording medium, but can also provide some basic service for the defect by a service person (who may be a general operator or a part-time operator).

More specifically, the service person will analyze the defect in the recording medium with the help of a service manual, and decide the cause. As a result, when the cause of the defect is found, the service person informs the user $U_1$ (or the user $U_2$) of the result of analysis, and returns the recording medium to the user $U_1$ (or the user $U_2$). On the other hand, when the cause of the defect can not found by the basic service, H the recording medium is sent to an expert in a sealed state for confidential reasons from the service center $SV_1$ or $SV_2$. The expert H then analyzes the defect in the recording medium as a secondary service, and then informs the user $U_1$ (or the user $U_2$) of the result of analysis and returns the recording medium to the user $U_1$ (user $U_2$).

Thus, according to this embodiment, since the security is assured in the service centers $SV_1$ and $SV_2$, the primary service can be provided by the service person (general operator or part-time operator) hired at a lower salary than the expert H. Hence, according to this embodiment, since the amount of the recording media sent to the expert H can be decreased compared with the prior art, it is possible to reduce the number of the experts H, thereby lowering the costs of service and maintenance.

In the above, an embodiment of the present invention has been described in detail with reference to the drawings. However, the specific structure of the present invention is not necessarily limited to this embodiment, and modifications of the design within the scope of the invention are also included in the present invention. For instance, in this embodiment, a magneto-optical disk is explained as an example of the recording medium 40. However, the types of the recording media are not restricted if the recording media need to be secured to protect the recorded data from unauthorized access.

Accordingly, the present invention is applicable not only to other recording media such as floppy disks, magnetic disks, optical disks, phase-transition-type optical disks, IC (integrated circuit) cards, memory cards and magnetic strip cards, but also to an apparatus incorporating a recording medium, such as a magneto-optical disk device.

Moreover, in this embodiment, although three coding algorithms are explained with reference to FIG. 2A to FIG. 2C, it is possible to use other coding algorithms (such as ENIGMA, IDEA, and a hashing function). Namely, any coding algorithm can be used if it is a one-way function.

As explained above, according to this invention since a coded password produced from a user password using a one-way function is written on a recording medium, a third party (including a service person) can not derive the user password from the coded password because of the characteristics of the one-way function. Since the third party can not actually obtain the user password by using whatever means, it is possible to prevent unauthorized access to the recording medium, thereby producing the effect of significantly improving the security.

Moreover, since a highly secured recording medium can be given to the user, it is possible to produce the effect of improving the customer service. Furthermore, since a service person (general operator or part-time operator) hired at a lower salary than an expert can provide a service to the defect in the recording medium while assuring the security, it is possible to lower the costs of service and maintenance.

In addition, when setting or changing a user password, whether a user performing the setting is an authorized person or not is checked by password checking, and a new coded password is written on the recording medium only when the two passwords match. Thus, this invention produces the effect of assuring the security even after the setting.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A storage apparatus comprising:
   a coding unit which generates a coded password from a password input by a user using a one-way function;
   a reading unit which reads out a coded password from a recording medium;
   a checking unit which compares the coded password generated by said coding unit and the coded password read out from said recording medium; and
   an access control unit which permits access to said recording medium if the two coded passwords match, and prevents access to said recording medium if the two coded passwords do not match.

2. The storage apparatus according to claim 1, further comprises a setting unit for setting the password,
   wherein said coding unit encodes an already set user password and a new user password to be newly set, which are input by the user, using the one-way function to generate an old coded password and a new coded password, respectively,
   said checking unit compares the old coded password generated by said coding unit and the coded password read out from said recording medium, and
   said setting unit writes the new coded password on said recording medium when said checking unit judges that the old coded password and the coded password read out from said recording medium match with each other.

3. A storage apparatus comprising:
   a recording medium on which a coded password generated by coding a password assigned to a user using a one-way function is recorded;
   a coding unit which generates a coded password from a user password input by a user using the one-way function;
   a reading unit which reads out a coded password from a recording medium;
   a checking unit which compares the coded password generated by said coding unit and the coded password read out from said recording medium; and
   an access control unit which permits access to said recording medium if the two coded passwords match, and prevents access to said recording medium if the two coded passwords do not match.

4. An access control apparatus for a recording medium, having a function of controlling access to a recording medium on which a coded password produced by coding a user password assigned to a user with a one-way function is recorded, comprising:
   a coding unit which produces a coded password by coding the user password input by the user utilizing the said one-way function;
   a checking unit which compares the coded password produced by said coding unit and the coded password read out from the recording medium; and
   an access control unit which permits access to said recording medium when the passwords compared by said checking unit match, and prevents access to said recording medium when the passwords do not match.

5. An access control method for a recording medium comprising the steps of:
   generating a coded password from a user password input by a user using a one-way function;
   reading a coded password from a recording medium;
   comparing the coded password generated at the coding step and the coded password read out from said recording medium; and
   permitting access to said recording medium if the two coded passwords match, and prevents access to said recording medium when the two coded passwords do not match.

6. The access control method according to claim 5, further comprises a setting step of setting the password,
   wherein at the password generating step, an already set user password and a new user password to be newly set, which are input by the user, are encoded using the one-way function to generate an old coded password and a new coded password, respectively,
   in the password comparing step, the old coded password generated at the password generating step and the coded password read out from said recording medium are compared, and
   in the setting step, the new coded password is written on said recording medium when it is judged at the password comparing step that the old coded password and the coded password read out from said recording medium match with each other.

7. An access control method for a recording medium comprising the steps of:
   recording a coded password generated by coding a password assigned to a user using a one-way function on a recording medium;
   generating a coded password from a user password input by a user using a one-way function;
   reading the coded password from said recording medium;
   comparing the coded password generated at the coding step and the coded password read out from said recording medium; and
   permitting access to said recording medium if the two coded passwords match, and prevents access to said recording medium when the two coded passwords do not match.

8. An access control method for a recording medium, which method controls access to a recording medium on which a coded password produced by coding a user password assigned to a user with a one-way function is recorded, the method comprising the steps of:

generating a coded password by coding the user password input by the user utilizing the one-way function;

comparing the coded password generated at the coding step and the coded password read out from said recording medium; and permitting access to said recording medium if the two coded passwords match, and prevents access to said recording medium when the two coded passwords do not match.

* * * * *